Dec. 3, 1963     G. H. MEYFARTH, JR     3,112,822
BUCKET TYPE CONVEYOR MECHANISM
Filed Dec. 2, 1960     2 Sheets-Sheet 1
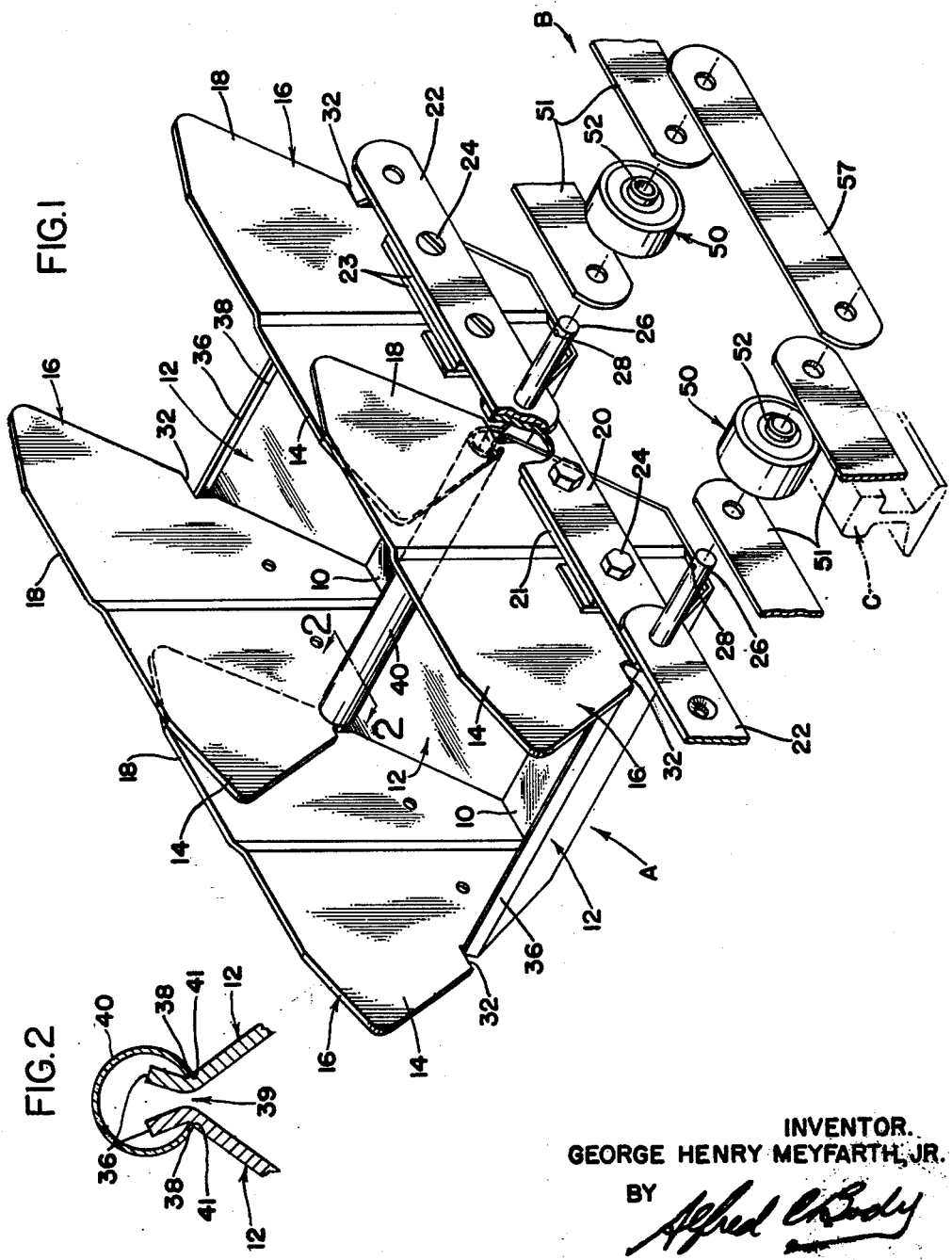
INVENTOR.
GEORGE HENRY MEYFARTH, JR.
BY
ATTORNEY

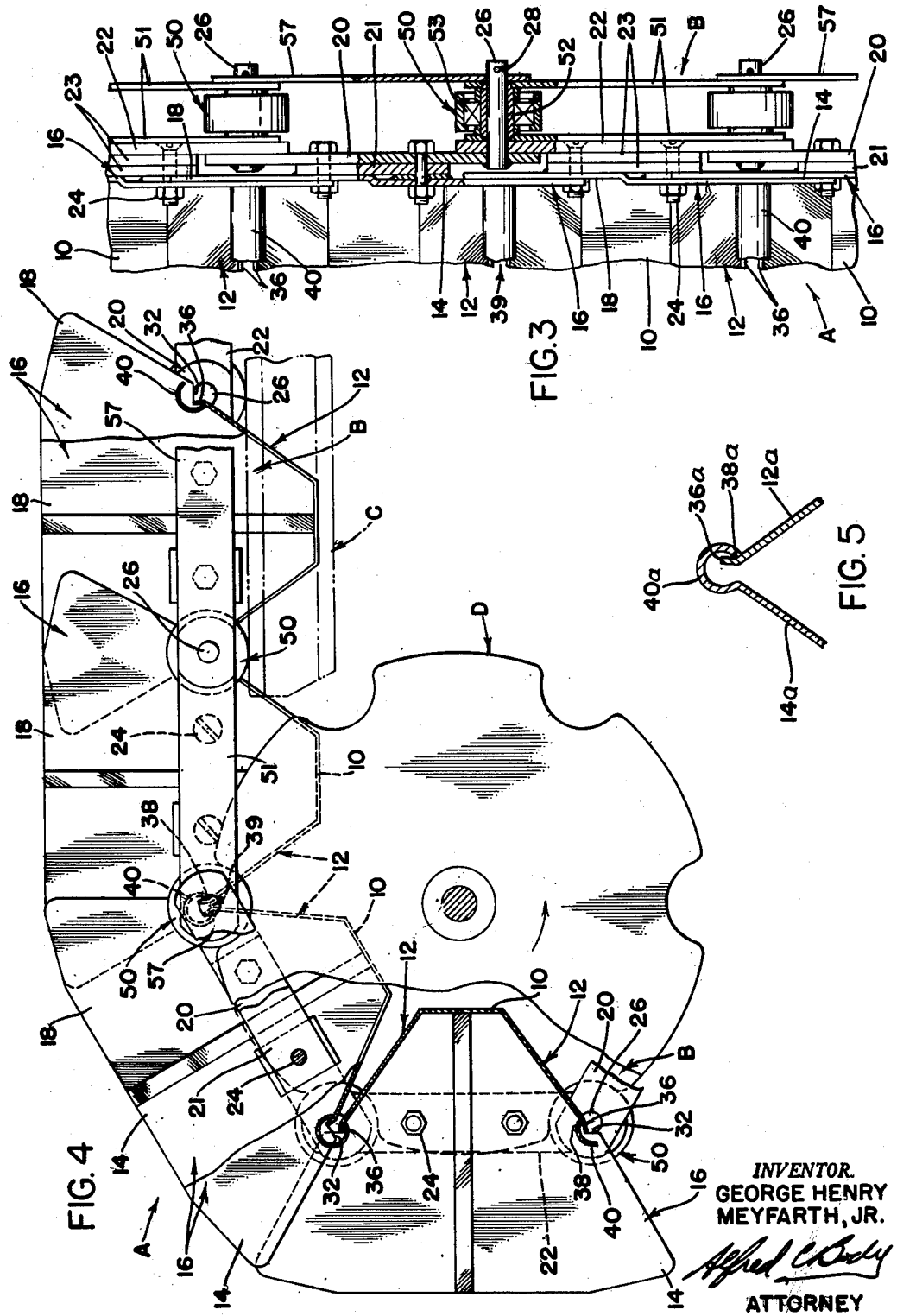

United States Patent Office 3,112,822
Patented Dec. 3, 1963

3,112,822
BUCKET TYPE CONVEYOR MECHANISM
George Henry Meyfarth, Jr., Macedonia, Summit, Ohio, assignor to May-Fran Manufacturing Co., Cleveland, Ohio
Filed Dec. 2, 1960, Ser. No. 73,377
8 Claims. (Cl. 198—145)

This invention pertains to the art of conveyors, and more particularly to an endless bucket type conveyor.

The invention is particularly applicable to endless bucket type conveyors of the type intended to transport relatively fine granular materials from one point to another, either horizontally or vertically, or both and will be described with particular reference thereto, although it will be appreciated that the invention has other and broader applications.

In the art of endless bucket type conveyors, it has been conventional in the past to provide a plurality of buckets in end-to-end relationship with the adjacent ends of adjacent buckets articulated relative to each other by means of a piano-hinge type joint. In some instances, an endless chain is provided at each side of the buckets provided with rollers whereby the conveyor may be supported as it moves from point to point over arcuate guide surfaces or around sprockets or the like.

One of the principal problems with conveyors of this type has been the abrasive action of many of the granulated materials which must be conveyed. Such materials work their way into the spaces of the piano hinge joint and rapidly wear the surfaces causing early failure of the belt.

The problems of wear of the piano hinge joint can be eliminated by slightly spacing the ends of adjacent buckets so that there is no rubbing action therebetween. However, with such an arrangement, the granulated material passes between the ends of the bucket with equally undesirable results.

The present invention contemplates a new and improved bucket type conveyor which overcomes all of the above-referred to difficulties and others, and provides a conveyor which is simple in construction, economical to manufacture and which effectively prevents granulated material from falling between the adjacent edges of the buckets.

In accordance with the broadest aspects of the present invention, adjacent buckets have their end walls in slightly spaced relationship and the buckets are held in end-to-end relationship by chain links disposed at the sides thereof and means are provided for covering over the space between the ends of adjacent buckets.

In a somewhat more limited aspect of the invention, adjacent buckets have end walls upwardly converging and thence diverging to form close spaced apices. Cover means extend from one end wall over the upper edge of the other end wall thereof to the apex thereof to cover the space between the apices. The axes of articulation of the chain links are then so located relative to the apices that the longitudinal movement of the apices relative to each other for the maximum relative angle of articulation of adjacent buckets will be less than that which the cover means can compensate for by flexure without exceeding the fatigue strength of the cover means.

In the preferred aspect of the invention, the axes of articulation are close to, parallel to, and generally in the plane defined by adjacent apices.

The cover means in limited aspects of the invention may take the form of one end wall extending up and over the end of the other diverging end wall and terminating in the apex thereof, or in the form of a C-shaped tube having parallel extending spaced edges, one disposed in each apex and with the body of the tube extending upwardly over the upper edges of the two adjacent end walls.

Further in accordance with the invention, each bucket has a chain link rigidly fastened thereto and articulated relative to a corresponding link on the adjacent buckets by a hinge pin extending transversely outwardly from the chain links and a roller link assembly adapted to rest on a track or engage a sprocket is removably supported on the hinge pins whereby the roller link assembly which is the part primarily subject to wear, may be readily removed and replaced without disturbing the assembled relationship of the buckets.

The principal object of the invention is the provision of a new and improved bucket type chain conveyor which is simple in construction, which prevents passage of fine granular material between adjacent buckets, which will have a long-repair-free life and wherein the parts which were subjected to the maximum wear may be readily replaced.

Another object of the invention is the provision of a new and improved arrangement for an endless bucket type conveyor including a plurality of buckets in slightly spaced, end-to-end articulated relationship in combination with cover means for covering over the space.

Another object of the invention is the provision of a new and improved arrangement for an endless, articulated bucket type conveyor made of a plurality of buckets in slightly spaced, end-to-end relationship in combination with metallic means engaging adjacent buckets covering the space therebetween with the conveyor being so arranged as to flex the cover means an amount less than the fatigue strength of the cover means.

Another object of the invention is the provision of a new and improved bucket type conveyor having a roller chain disposed at the sides thereof for supporting the weight thereof wherein the rollers may be readily removed and replaced while maintaining the buckets in their normal assembled relationship.

Another object of the invention is the provision of a new and improved arrangement for an endless bucket type conveyor wherein cover means are provided for the upper edges of adjacent end walls of the buckets, the arrangement being such that the cover means are flexed a minimum as the buckets are articulated relative to each other.

Still another object of the invention is the provision of a new and improved arrangement for preventing granular material falling between the adjacent edges of an endless bucket type conveyor wherein the cover means engage portions on the end walls of the bucket which have a minimum relative movement as the buckets articulate relative to each other.

Another object of the invention is the provision of a new and improved arrangement for an endless bucket type conveyor wherein cover means extend over the upper edges of adjacent end walls of the buckets and engage the end walls on predetermined lines, and means are provided for pivoting the buckets about an axis parallel to and in the plane of said line such that as the buckets articulate, the lines move apart relative to each other a minimum amount.

The invention may take physical form in certain parts and arrangements of parts, preferred embodiments of which will be described in detail in this specification and illustrated in the accompanying drawings which form a part hereof and wherein:

FIGURE 1 is a partially exploded perspective view of a section of a bucket conveyor illustrating a preferred embodiment of the present invention;

FIGURE 2 is an enlarged cross-sectional view taken along the line 2—2 of FIGURE 1;

FIGURE 3 is a fragmentary top view of the assembly shown in FIGURE 1 rotated 90°;

FIGURE 4 is a view showing the conveyor assembly of FIGURE 1 passing around a sprocket; and FIGURE 5 is a view similar to FIGURE 2, but showing an alternative embodiment of the invention.

Referring now to the drawings wherein the showings are for the purposes of illustrating preferred embodiments of the invention only and not for the purposes of limiting same, FIGURES 1, 3 and 4 show a conveyor system comprised of a plurality of serially arranged buckets A each carried between a pair of links supporting and driving chains B in turn supported on a track C and/or sprocket members D.

Each of the buckets A is comprised of a floor 10, a pair of end walls 12, diverging upwardly from the floor and a pair of side walls 16. As shown, the end walls 12 diverge upwardly from the floor and at the upper edge have a reversely bent portion 36 forming with the lower portion of the end wall an apex 38, the function of which will appear hereinafter.

Thus, as will be more clearly seen from FIGURES 1, 2 and 3, adjacent end walls 12 of adjacent buckets converge in an upward direction to the apices 38 and thence diverge upwardly for a short distance to define a space 39 therebetween.

In the embodiment shown, the end walls of adjacent buckets are identical in structure except for being rights and lefts, although it will be appreciated that this construction is not a necessity. It is important, however, that the apices of adjacent buckets be located opposite to each other and as close together as manufacturing tolerances will allow.

The side walls 16 each extened longitudinally of the conveyor system to meet with the transverse edges of the end walls 12 to form a bucket closed at the bottom and opening upwardly. The side walls 16 preferably, although not necessarily, project above the top edges of the end walls 12. The longitudinal edges of the side walls have notches 32 cut to receive the reversely bent portions 36.

As shown, each of the side walls 16 has a transverse offset 18 generally on the vertical midline of an amount generally equal to the thickness of the metal forming the side walls 16 so that the side walls 16 of adjacent buckets may overlap and yet be articulated relative to each other. A generally continuous surface is provided for holding the granular material in the buckets A.

One chain B is located on each side of the buckets A. Each chain B is comprised of a plurality of inner and outer link members 20, 22 respectively, each fastened to a side wall 16 by any suitable means but preferably by means of the nuts and bolts 24 shown. The ends of adjacent members 20, 22 overlap and a hinge pin 26 welded to the end of each inner member 20 extends transversely outwardly through an opening in the end of each of the outer members 22. These members 20, 22 and the hinge pins 26 pivotally connect adjacent buckets A so that they may be relatively articulated relative to each other. As will appear, the location of the axes of these pins 26 is important.

The hinge pins 26 have a hole 28 in the outer end thereof for the reception of cotter pins or the like. An elongated washer 21 spaces the inner member 20 from its side wall 16 while two of such washers 23 space the outer member 22 from its side wall 16. Obviously, other arrangements could be employed for mounting the buckets A on the chain B.

In accordance with the present invention, means are provided to cover the space 39 and prevent granular materials from falling therethrough. Such means may take a number of different forms, but in accordance with the preferred embodiment of the invention, the means comprise a generally C-shaped tubular member 40 positioned so that its longitudinally spaced edges 41 lie in the apices 38 and the body of the member passes upwardly and over the end of the reversely bent portions 36. This tubular member 40 has a longitudinal length generally equal to the transverse spacing between the inner surfaces of the side walls 14 to completely enclose and prevent the entrance of material into the space 39.

The member 40 is preferably of a spring-like material and its edges are normally so spaced as to exert a slight resilient pressure at all times on the apices 38. In effect, the edges of the tube 40 are in sealing engagement with, pivotally rest in, and are located by the apices 38.

With this arrangement, as the buckets move from a line and pass around sprocket D as is shown in FIGURE 4, the buckets articulate relative to each other on the axes of the hinge pins 26 and there will be a slight longitudinal movement of the apices 38 relative to each other. Such relative movement is compensated for by the flexing of the C-shaped member 40. If the relative longitudinal movement of the apices 38 is sufficiently large, the C-shaped member will be flexed beyond its ultimate strength and will break. Repeated flexing below the ultimate strength can produce fatigue cracks and fractures in the member 40.

In accordance with the present invention, the relative longitudinal movement of the apices is held to an amount such that the C-shaped member 40 will not be flexed in an amount to exceed its fatigue limit. In the embodiment of the present invention shown, this is done by arranging the length of the members 20, 22 and the vertical spacing from the floor 10 are such that the axis of each hinge pin 26 is parallel to, preferably mid-way between, and in the plane defined by the apices 38. The buckets A articulate on this axis. With such an arrangement, it will be apparent from an examination of the geometry, that for any angle of articulation, the apices 38 will have the absolute minimum relative longitudinal movement. Such relative movement "$m$" between the two apices in terms of the angle of articulation "$a$" from a straight conveyor belt may be defined by the following formula:

$$m = d \text{ sine } a$$

where $d$ equals the spacing between the apices when the conveyor belt is straight.

Thus the dimension $d$ should be the minimum permitted by conventional manufacturing tolerances so that the apices do not touch, or if they do touch, with a minimum pressure.

In this respect, it is to be noted that conveyor belts of the type to which this invention pertains are used in relatively rough service and it is normally not conventional to employ the highest standards of manufacturing tolerances. It is primarily necessary that the axes of the hinge pins be located relative to the apices such that the relative longitudinal movement of the apices will be less than that to which the C-shaped member 40 can readily compensate for by continued flexing without developing fatigue fractures.

The angle of convergence and the angle of divergence of the end walls 12 and the reversely bent portion 36 is determined primarily by the maximum angle of relative articulation of adjacent buckets.

The apices are shown as sharp angled. They may be more arcuate if desired. If so, the axes of the pins 26 should be located approximately on the plane defined by the centers of curvature and through the space 39.

To install one of the C-shaped members 40, the buckets are articulated in a manner such as to bring the reversely bent portions 36 so as to be approximately parallel. In any event, it is necessary to bring the upper edges of the portions 36 into sufficiently close spaced relationship that the longitudinally extending edges of the C-shaped member 40 may be forced over the spaced ends of the reversely bent portions 36 and thereafter the member 40 is simply hammered into position. Once in position, the edges thereof will rest in the apices 38 and the buckets A may then be articulated back to either a straight line position or so as to be articulated around the sprocket D.

FIGURE 5 shows another embodiment of the invention wherein only the upper edge portion 36a of wall 12a on each bucket is reversely bent to provide a transversely-extending notch 38a. The upper edge of wall 14a is bent over the gap between the walls 14a and 12a on successive buckets to form the C-shaped configuration 40a which is integral with wall 14a. The operation of this embodiment is similar to that shown in the other drawings, however, it has the advantage of minimizing the number of separable parts required for the complete conveyor system.

For the purpose of transferring the weight of the buckets A and the material contained therein to a support, a plurality of roller link assemblies are provided which ride on the track C. Each assembly includes a pair of rollers 50, each rotatably supported on an axially extending sleeve 52 by means of a bearing 53. The ends of the sleeves are press fitted into a pair of link members 51 which space the rollers 50 apart a distance equal to the spacing of the hinge pins 26. The sleeves 52 each have axial passages therethrough and fit over adjacent hinge pins 26.

Each roller link assembly may be readily slipped onto or off of a pair of adjacent hinge pins 26 as a unit.

It is to be noted that each roller link assembly is comprised of two roller wheels and that these assemblies are mounted on adjacent pairs of hinge pins 26. An additional chain link member 57 may extend between the hinge pins 26 of adjacent pairs. A cotter pin, not shown, extends through the hole 28 to hold the chain link members 57 and the roller assemblies in asesmbled relationship on the hinge pins 26.

Thus it will be seen that a chain assembly of spaced buckets has been described wherein the gap between adjacent buckets is completely covered over so that no granular material can pass therebetween and that the means for preventing the passage of such material will not be worn by the presence of the granular material which might be abrasive nor broken by articulation of the buckets.

Additionally, the rollers supporting the bucket assembly can be readily replaced without removing the hinged connection between adjacent buckets. Also, the roller assemblies can be supplied with sealed tight bearings which, if they do wear, can be readily replaced.

The invention has been described with reference to preferred embodiments. Obviously, modifications and alterations will occur to others upon a reading and understanding of this specification and it is my intention to include all such modifications and alterations insofar as they come within the scope of the appended claims.

Having thus described my invention, I claim:

1. In a conveyor comprising a plurality of buckets in end-to-end relationship, each bucket having two spaced end walls and two side walls, two parallel, endless members having articulative links with one of said members on each side of said buckets, means connecting said buckets onto said endless members, the improvement comprising: said end walls of adjacent buckets converging upwardly to form an apex defining an articulative dihedral angle between said adjacent end walls with the terminal edges of said end walls defining a transversely extending space, means articulating said links about axes generally coaxial with the apices formed by adjacent end walls, transversely extending, continuous sheet-like means extending longitudinally from one end wall over said space and into rubbing engagement with the other of said adjacent end walls below said terminal edge of said other end wall, and means on said other adjacent end wall and at said terminal edge forming an abutment for preventing upward sliding movement of said sheet-like means over said terminal edge of said adjacent end wall during operation of said conveyor.

2. The improvement as defined in claim 1 wherein said sheet-like means includes a C-shaped tube having spaced longitudinally extending edges, said tube edges being disposed in and supported by said adjacent end walls with the body of said tube extending over the space between said end walls.

3. The improvement as defined in claim 1 wherein one of said end walls above its terminal end extends over the upper edge of the adjacent end walls and into sliding engagement with said adjacent end wall below the terminal edge thereof.

4. The improvement as defined in claim 1 wherein said means articulating said links includes a hinge pin between adjacent links of said endless member with said hinge pins generally aligned with the apices formed by adjacent end walls of said buckets.

5. In a conveyor system, a pair of parallel longitudinally extending endless chains having articulative links, a plurality of serially-arranged load-carrying buckets carried between the chains and each including a floor for each bucket, a pair of end walls extending upwardly from said floor in diverging relationship a transversely extending gap therebetween, transversely extending sheet-like spring means spanning the gap between the upper extremities of the walls on adjacent buckets, said spring means extending across the full transverse width of the buckets and being generally impervious to prevent material from dropping between the buckets while permitting limited relative movement between the upper extremities of said walls and means articulating said links about axes generally aligned with said gaps between said end walls.

6. The combination claimed in claim 5 wherein the spring means is generally C-shaped in cross section with the long transverse edges of the C-shaped spring means being positioned on the upper extremities of walls on adjacent buckets, the arrangement being such that the C-shaped cross section will flex inwardly or outwardly from a center point upon relative movement between adjacent buckets and means on the upper extremities of said walls for preventing sliding movement of said sheet-like spring means over the extremities of said wall during operation of said conveyor.

7. In a conveyor system, a pair of parallel longitudinally extending endless chains having articulative links, a plurality of serially-arranged load-carrying buckets carried between the chains, a floor for each bucket extending transversely between the chains, a pair of end walls extending upwardly from said floor in diverging relationship and transversely of the chains, said end walls of adjacent buckets being sligrtly spaced from each other to form a transverse gap, at least one of the walls on each bucket having its upper edge portion reversely bent toward the transverse center line of the bucket to form an apex, a generally C-shaped, transversely extending spring means for spanning the transverse gap between the end walls on adjacent buckets, said spring means extending from the end wall of an adjacent bucket and having at least one transversely-extending edge supported in said apex and means for articulating said links about axes generally aligned with said gap between said end walls and adjacent said apex.

8. A load-carrying bucket for an endless conveyor having a pair of spaced chains comprising articulative links each of which carries one of said buckets arranged in serial relationship said bucket comprising, in combination, a floor adapted to extend transversely between the chains, a pair of end walls extending upwardly from the floor in diverging relationship and also adapted to extend transversely between the chains, at least one of said walls having its upper edge portion reversely bent toward the transverse center line of the bucket for the reception of one edge of a spring member adapted to span the gap between the spaced upper edge portion and means for articulating said links about axes generally aligned with said gaps between adjacent end walls of an adjacent bucket for closing the space between said upper edge portions.

References Cited in the file of this patent

UNITED STATES PATENTS

| | | |
|---|---|---|
| 1,432,076 | Mellin | Oct. 17, 1922 |
| 2,936,063 | Hemsley | May 10, 1960 |

FOREIGN PATENTS

| | | |
|---|---|---|
| 58,541 | Netherlands | Nov. 15, 1946 |